April 28, 1964     E. T. MacKENZIE     3,130,708
AUTOMATIC POULTRY FEEDING DEVICE
Filed Feb. 20, 1962     3 Sheets-Sheet 1
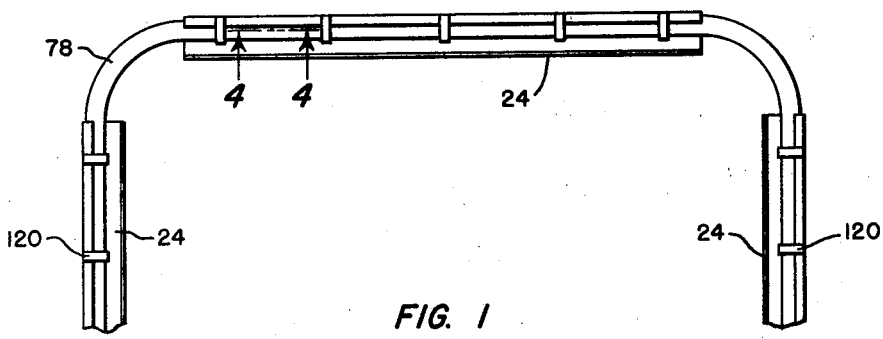
FIG. 1
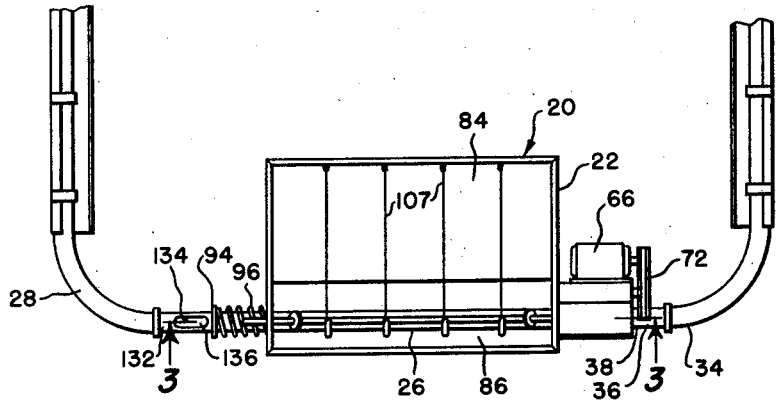
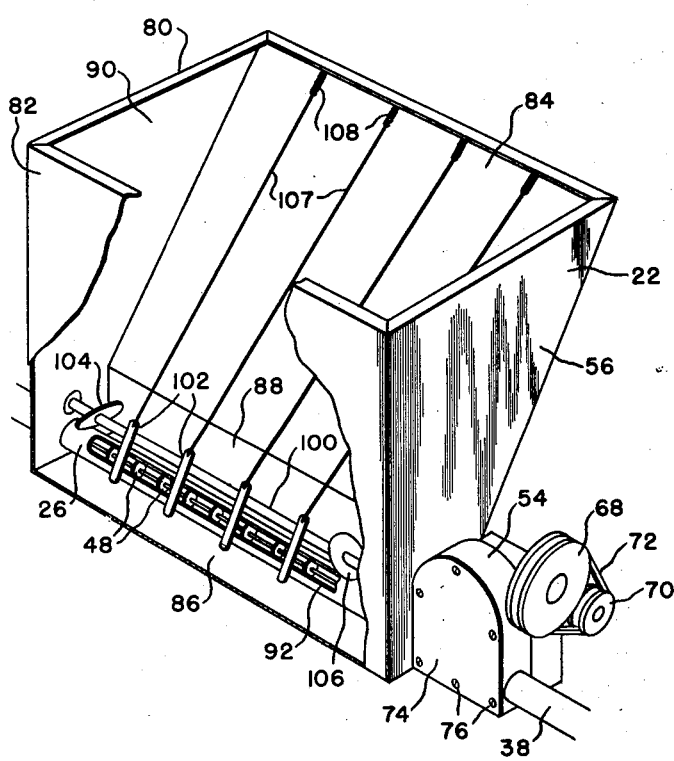
FIG. 2
INVENTOR.
EDWARD T. MACKENZIE
BY Fulwider, Mattingly
& Huntley
ATTORNEYS

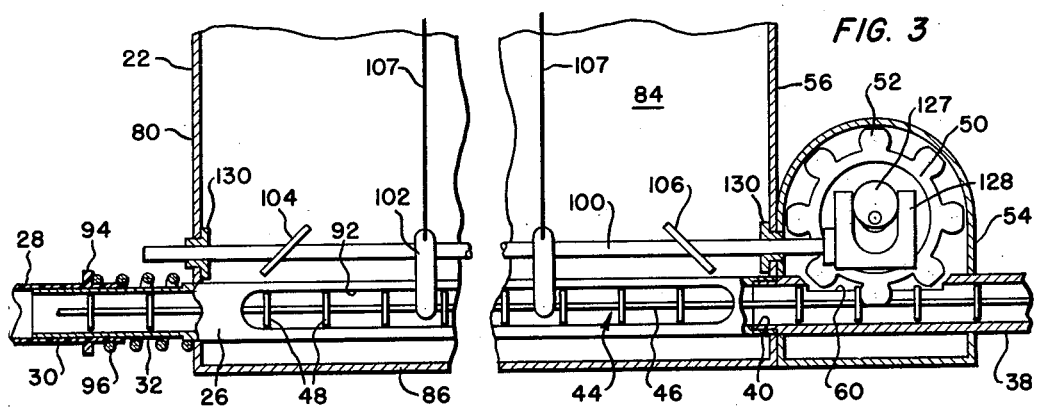
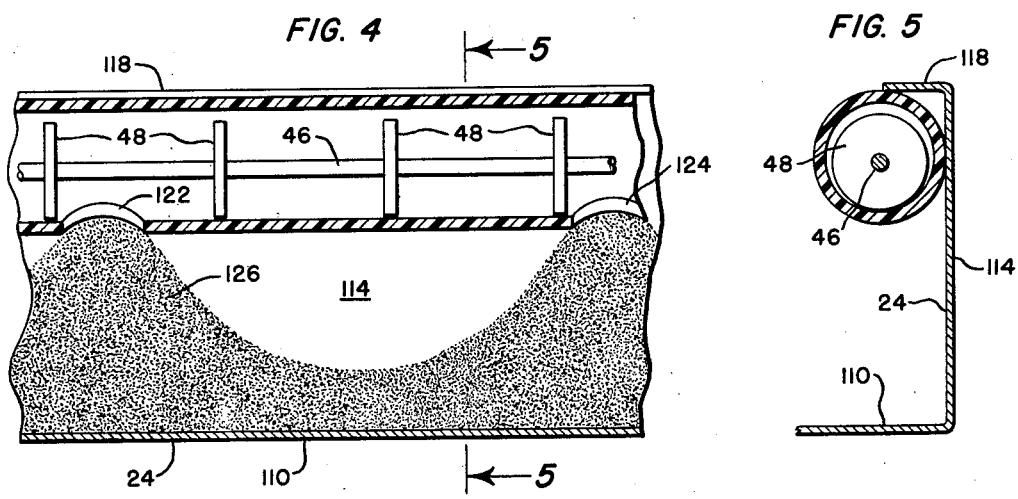
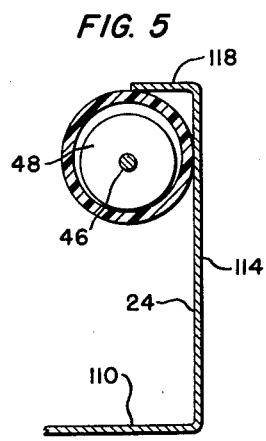
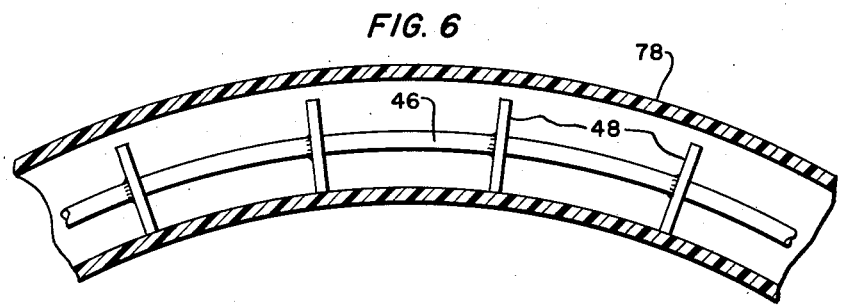
INVENTOR.
EDWARD T. MACKENZIE

April 28, 1964  E. T. MacKENZIE  3,130,708
AUTOMATIC POULTRY FEEDING DEVICE
Filed Feb. 20, 1962  3 Sheets-Sheet 3

INVENTOR.
EDWARD T. MACKENZIE

BY Fishneider, Mattingly
& Huntley

ATTORNEYS

United States Patent Office 3,130,708
Patented Apr. 28, 1964

3,130,708
AUTOMATIC POULTRY FEEDING DEVICE
Edward T. MacKenzie, Box 1142, Hillcrest Lane, Ramona, Calif.
Filed Feb. 20, 1962, Ser. No. 174,422
11 Claims. (Cl. 119—53)

The present invention relates to an automatic feeder for poultry feed or the like, and more particular to a feeder for delivery of feed to a plurality of selected zones.

The present invention contemplates the employment of a hopper for the feed. The feed is delivered from the hopper to a receiver in the form of a tube. The tube, preferably, is endless. It is supplied with feed from the hopper and all excess, not delivered to the selected feeding zones, is returned to the hopper.

The endless tube includes a section which is in feed relationship with the hopper, and includes a feed delivering section having the opposite ends thereof connected with the opposite ends of the feed receiving section. The delivering section is formed, preferably, of flexible material, such as flexible plastic, one such plastic being polyethylene.

The conveyor system for the feeder also includes an endless rack, preferably comprising an endless steel wire having spaced flights thereon. These flights are in the form of circular steel washers or disks which are resistance-welded to the wire.

The receiving section of the endless tube is in feed receiving relationship with the feed in the hopper. That section is open to the interior of the hopper, preferably through an elongated longitudinally extending slot. It is in telescopic relationship with the ends of the feed delivery section of the endless tube and is rotatable with respect to the delivery section and the hopper for the purpose of selectively adjusting the quantities of feed to be delivered.

The delivering section also includes a portion, preferably formed of metal, and is provided with an elongated and longitudinally disposed slot. A gear having teeth extends into the slot and these teeth are engageable with the flights on the conveyor for driving the conveyor.

Agitators are disposed adjacent the slot in the receiving tube section in the hopper. These agitators are actuated by a reciprocating shaft. Preferably, the motor which drives the gear also imparts reciprocating movement to the shaft which activates the agitators.

The lower ends of upwardly extending elements are also reciprocated by the shaft. These elements are in the form of a wire, rope, chain, etc. The upper ends of the elements are connected to the upper part of the hopper. Each of these elements includes an elastic such as a spring. Reciprocation of the shaft causes agitation of the feed throughout the entire height of the hopper.

The delivering section of the endless tube is provided with a series of openings, one opening for each zone to which feed is to be delivered. The flights push the feed through the tube and the feed falls through the openings. As the feed rises and encompasses an opening, it functions as a valve to prevent further discharges of feed from the feed encompassed opening.

Further features and the advantages will be apparent from the following description, reference being had to the accompanying drawings wherein a preferred embodiment of the invention is illustrated.

In the drawings:

FIG. 1 is a top plan view of the automatic feeder and is specifically shown as an automatic feeder for feed for poultry;

FIG. 2 is a perspective view of the hopper and the driving mechanism for the conveyor, but in a larger scale with respect to FIG. 1, part of the hopper being broken away to show details;

FIG. 3 is a fragmentary view partly in section, the section being taken substantially along line 3—3 of FIG. 1, but on a larger scale;

FIG. 4 is a fragmentary view and section taken along line 4—4 of FIG. 1, but on a larger scale;

FIG. 5 is a sectional view taken substantially along line 5—5 of FIG. 4;

FIG. 6 is a view of a fragment of a corner of the conveying apparatus, but in a larger scale with respect to FIG. 1, the plastic tube being shown in section;

Figure 7:
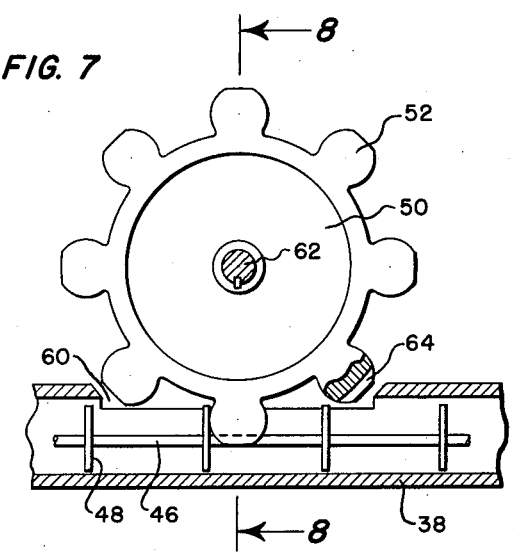
FIG. 7 is a fragmentary view of the drive mechanism for the conveyor, but in a larger scale with respect to FIG. 1, part of the driving gear and the conveyor tube being shown in section.

Referring more in detail to the drawings, the feeder is generally shown at 20. It includes a hopper 22, series of feed troughs 24, and a conveyor system for conveying the feed from the hopper 22 to the troughs. Generally this conveyor system comprises an endless receiver in the form of a tube including a tube section 26 which is disposed in the bottom of the hopper 22, a flexible plastic U-shaped tube section 28 having one end 30 in telescopic relationship with an extended end 32 of the section 26. The other end 34 of this flexible tube is in telescopic relationship with the right end 36 of a tube section 38. The left end 40 of this tube section is in telescopic relationship with the right end of the tube section 26. Preferably, the tube 28 is formed of polyethylene.

The conveyor system also includes an endless rack 44. This rack comprises a loop of steel wire 46 and a series of flights 48 which are connected, each by resistance-welding, to the wire 46 at equally spaced intervals along the wire. This rack is disposed within the endless loop provided by tubes 26, 28 and 38.

Figure 8:
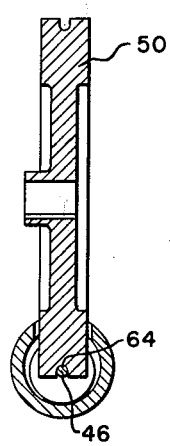
FIG. 8 is a sectional view taken along line 8—8 of FIG. 7.

The mechanism for driving the conveyor comprises a gear 50 having teeth 52. This gear is contained within a housing 54 which is suitably attached to the right side wall 56 of the hopper 22. This gear, as is more clearly shown in FIGS. 3, 7 and 8, extends through an elongated slot 60 in the tube 38. Preferably, this gear is disposed above the tube 38. This gear is driven by a shaft 62, in a clock-wise direction as viewed in the drawings, and the teeth thereof are arranged to engage the flights 48 and move these flights to the left. Thus the gear pulls from the right and pushes to the left. As will be observed more clearly from FIGS. 7 and 8, the teeth 52 of the gear are provided with slots 64 which are adapted to be received by the wire 46. In this manner, although the pressure is applied to the top section of the flight by the teeth 52, nevertheless, buckling of the wire is prevented, which buckling would be apt to occur if the wire was not engaged by the teeth.

The shaft 62 of the gear 50 is driven through suitable gear reduction by a motor 66, part of such gear reduction including pulleys 68 and 70 and a belt 72. The front of the housing 54 is provided with a removable cover 74 held in place by screws 76.

From the foregoing it will be apparent that when the motor is activated the conveyor will be moved through the endless tube. The tube 28, being formed of a flexible plastic material, such as polyethylene, can be integral and U-shaped, thus providing the necessary curved corners 78 which connect the legs with the yoke of the U-shaped tube. The wires 46 are flexible and resilient whereby they, through the flights 48, can readily conform and follow the contour of the tube 28. It will be understood that although not specifically shown, such flexibility of the tube 28 and the wires 46 provide for not only bending of the elements while they are in a horizontal plane, but also they can be flexed so that they extend from one horizontal plane to a higher or lower horizontal plane, thus lending themselves to a system in which some of the feed troughs are located at a higher horizontal plane than others. Since the tubes 28 are formed of plastic, the generation of noise created by the engagement of the flights with the inter-surface of the tube, is maintained below an annoying noise.

The hopper 22 includes the right side wall 56 and opposite wall 80, the front wall 82, a rear wall 84 and a bottom wall 86. The upper portion of the rear wall 84 extends at an angle sloping forwardly and downwardly and joins with a vertical portion 88. The side walls 56 and 80 conform to the shape of the rear wall. The top of the hopper 20 is open as shown at 90 for receiving the feed. The tube 26 is provided with an elongated and longitudinally extending slot 92. The tube 26 is so disposed at or adjacent the bottom of the hopper so that the slot 92 can be in feed receiving relationship with the hopper, and the tube is herein shown as disposed slightly above the bottom 86 of the hopper. Tube 26 is rotatably mounted whereby the slot 92 can be arranged in different feed receiving relationships with the hopper so as to adjust the quantity of feed being delivered to the tube 26. It is apparent that if the tube 26 is turned so that the slot 92 faces upwardly, the maximum amount of feed will be delivered to the tube; if the tube is turned so that the slot faces downwardly, the minimum amount of feed will be delivered to the tube. Thus by turning the tube 26, the amount of feed delivered thereto can be varied. Any suitable means may be provided for preventing endwise movement of the tube 26 to the left.

Referring more particularly to FIG. 3 it will be seen that the end portion 30 of the tube 28 is provided with a ring 94 which forms a shoulder and a coil spring 96 is interposed between this ring and the side wall 80 of the hopper. The telescopic relationship between the end 30 of the tube 28, and 32 of the tube 26, together with the spring 96, provides compensation for the relative difference in expansion and contraction of the tube 28 and the wire 46. For example, upon contraction of the wire loop 46, the tube will be pulled toward the right as viewed in FIG. 3, against the spring 96. When the wire loop expands, the spring 96 will assist the expanding of the tubular loop by forcing the ring 94 to the left.

Referring now more particularly to FIGS. 2 and 3, it will be seen that there has been provided mechanism for agitating the feed within the hopper 22. To accomplish this there is provided a reciprocating shaft 100. The plurality of fingers 102 are fastened to the reciprocating shaft and extend adjacent the tube 26. Upon reciprocation of the shaft 100, the fingers 102 will cause agitation of the feed immediately adjacent the slot 92 in the tube 26. The shaft 100 also carries two angularly disposed discs 104 and 106. These discs are disposed adjacent to side walls 80 and 56 respectively of the hopper, and upon reciprocation cause agitation of the feed and thereby prevent clogging of the feed adjacent these side walls. A plurality of upwardly extending elements 107 are connected to each of the fingers 102. These elements may be in the form of a rope, chain or wire and springs 108. The upper end of the rope 107 is connected to the coil spring 108 and the upper end of the coil spring is connected to the hopper adjacent the upper edge thereof. Upon reciprocation of the shaft 100 these elements are moved, the springs 108 permitting such movement and this movement causes agitation of the feed throughout the entire height thereof in the hopper.

Figure 9:
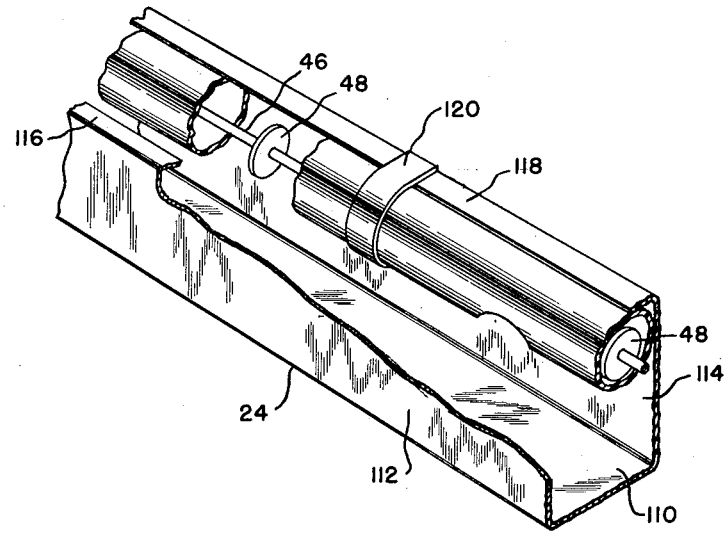
FIG. 9 is a perspective view of one of the feed troughs and a portion of the conveyor system, but in a larger scale relative to FIG. 1, parts of the feed trough and the flexible tube being broken away for clarity purposes.

Referring now to FIGS. 4, 5 and 9, it will be seen that the trough 24 includes a bottom wall 110 and vertically extending side walls 112, 114, and inwardly extending lips 116 and 118 at the top of said vertical walls, respectively. The tube 28 extends through these troughs and is secured underneath the lip 118 and alongside of the vertical wall 114 by straps 120. The bottom of the tube is provided with a plurality of openings, two of which are shown at 122 and 124 in FIG. 4. These openings are provided at desirable feeding zones. A trough can be provided for each chicken or a trough may be of sufficient length for feeding several chickens. In any event it is desirable to provide an opening similar to openings 122 and 124 for each chicken. As the flights 48 move, as for example to the left, the feed will be pushed to the left and will drop through the openings until the feed, indicated at 126 in FIG. 4, is built up to such a height as to block the flow through the respective opening, as shown in FIG. 4. Thus the feed functions as a valve for shutting off the further flow of feed to the particular zone. The flights 48 in themselves limit the amount of feed that can flow through an opening when the conveyor has been stopped. As seen in FIG. 4, should the conveyor be stopped, and should there be a demand for feed of a zone fed by opening 122, the flights on opposite sides of the opening 122 form a dam so that only the feed between said two flights can flow through the opening 122.

In the preferred embodiment, the same mechanism which drives the gear 50 is also utilized for reciprocating the shaft 100. As is more clearly shown in FIG. 3, the rotating shaft 62 carries the eccentric 127 which causes reciprocating movement to be imparted to a yoke 128 fastened to the right end of shaft 100. The walls 80 and 56 of the hopper carry bearings 130 for slidably supporting the shaft 100. Thus, whenever the conveyor is being actuated, the feed in the hopper is being agitated.

From the foregoing it is apparent that the feed herein shown is simple in construction, substantially fool-proof, and can be manufactured at a relatively low cost.

The rate of feeding can be controlled in a simple manner, to wit, merely turning the tube 26. Since the tube 28 is formed of plastic material, wear is reduced to a minimum and the flexibility of the tube compensates for unequal heights of these troughs which are being fed.

In the normal operation of the device, the tube 26 is adjusted so as to supply at least all of the feed that is necessary for the troughs, any excess of feed can readily pass through the tube section 38 and be returned to the tube 26 in the hopper. The condition may arise in which a lesser amount of chickens are being fed than the number of zones provided for such feeding. In this event, after the feed in the zone builds up to a predetermined height, the feed itself functions as a valve for preventing further delivery of the feed to a particular zone and, in the event of excess feed in the endless tube, such excess will be redelivered to the tube 26 in the hopper.

Referring to FIG. 1, the tube 28 is provided with a section 132 adjacent the steel tube 26. This section 132 is provided with a port 134 which is covered with a transparent piece 136, whereby the amount of feed being carried can be observed.

The wire 46 and the washers 48 are formed of spring steel which are heat treated and tempered.

While the form of embodiment herein shown and described constitutes preferred form, it is to be understood that other forms may be adopted falling within the scope of the claims that follow.

I claim:
1. In a feeder for material such as poultry feed or the like, in combination:
   (A) A hopper for material to be conveyed;
   (B) an elongated receiver for receiving material from the hopper;
   (C) means for adjustably controlling the rate of feeding material delivered to the receiver from the hopper, including a rotatably adjustable and normally sta- tionary tube for receiving material by gravity from the hopper;
  (a) said tube being open longitudinally thereof for receiving said material;
  (b) means supporting said tube for rotation about an axis extending longitudinally thereof;
(D) Means including spaced flights extending through the tube:
(E) and means for moving the last mentioned means.

2. An apparatus as defined in claim 1, characterized to include:
(F) A feed delivering tube in telescopic relationship with the material receiving tube and slidable longitudinally of one another;
  (c) said first mentioned means extending into the conveyor tube.

3. An apparatus as defined in claim 2, including
(G) Means yieldingly urging said delivery tube toward separating position from the material receiving tube.

4. An apparatus as defined in claim 2, including a coil spring surrounding said tubes, and normally tending to urge said delivering tube toward separating position from the material receiving tube.

5. An apparatus as defined in claim 1, characterized in that said receiver comprises a delivery tube having one end thereof connected with one end of the material receiving tube, and the other end connected to the opposite end of the material receiving tube.

6. A feeder as defined in claim 5, characterized in that the delivering tube is provided with a slot and second mentioned means includes a gear having teeth extending through the slot and engageable with the flights for moving the first mentioned means.

7. A feeder as defined in claim 5, characterized in that (c) the second mentioned tube is formed of flexible plastic such as polyethylene.

8. In a feeder for material such as poultry feed or the like, in combination:
(A) A hopper for material to be conveyed;
(B) a tube for receiving material by gravity from the hopper,
  (a) said tube being open longitudinally thereof for receiving said material;
  (b) means extending longitudinally of and adjacent the opening in the tube;
  (c) means supporting said tube for rotation about an axis extending longitudinally thereof;
(C) means including spaced flights extending through tube;
(D) and means for moving the second mentioned means and for agitating the first mentioned means.

9. An apparatus as defined in claim 8, characterized to include:
(E) An integral tube having one end connected to one end of the receiving tube and the other end connected to the other end of the receiving tube,
  (c) said second mentioned tube having a longitudinally extending slot therein,
  (d) said means for moving the second mentioned means and for agitating the first mentioned means comprising a
  (e) reciprocating shaft connected to the first mentioned means,
  (f) a gear having teeth extending into the slot and engageable with the flights for moving the same, and
  (g) means for reciprocating said shaft and rotating said gear.

10. A feeder as defined in claim 9, characterized in that the reciprocating shaft is disposed parallelly of the material receiving tube and carries
  (h) disks disposed at an angle to the axis of the shaft.

11. In a feeder for material such as poultry feed or the like, in combination:
(A) A hopper for material to be conveyed;
(B) a tube for receiving material by gravity from the hopper,
  (a) said tube being open longitudinally thereof for receiving said material;
  (b) agitatable means extending longitudinally of the opening in the tube;
  (c) elongated elements within and connected to the hopper adjacent the upper end thereof,
  (d) said elongated elements each including an elastic device;
  (e) means supporting said tube for rotation about an axis extending longitudinally thereof;
(C) Conveyor means including spaced flights extending through the tube;
(D) A reciprocatable shaft extending longitudinally of the tube,
  (e) said agitatable means and said elongated elements being connected with the shaft and reciprocated thereby;
(E) and means for moving the conveyor means and for reciprocating said shaft.

References Cited in the file of this patent
UNITED STATES PATENTS

| | | |
|---|---|---|
| 2,563,321 | Dugan | Aug. 7, 1951 |
| 2,640,462 | Doty et al. | June 2, 1953 |
| 2,794,421 | Rose et al. | June 4, 1957 |
| 2,888,128 | Allen | May 26, 1959 |
| 3,053,227 | Mitchell | Sept. 11, 1962 |